United States Patent Office 2,921,920
Patented Jan. 19, 1960

2,921,920

POLYETHYLENE TELOMER-POLYALKYLENE OXIDE BLOCK COPOLYMER AND METHOD OF PREPARING SAME

Joseph J. Smith, Upper Montclair, and Walter T. Reichle, Bloomfield, N.J., assignors to Union Carbide Corporation, a corporation of New York No Drawing. Application July 3, 1956
Serial No. 595,607

16 Claims. (Cl. 260—29.6)

This invention relates to novel polyethylene block copolymers and to new aqueous emulsions thereof useful in the coating and impregnating arts. More particularly this invention is concerned with emulsifiable polyethylene block copolymers formed by reacting together a polyethylene telomer and a compound having an epoxy-ethyl group.

The preparation of oxygen containing polyethylene resins by polymerizing ethylene in the presence of a catalyst and an alkyl ketone or monohydric secondary alcohol is well known. Such resins are now known as "telomers" and are ordinarily prepared at elevated pressures and temperatures. In U.S. Letters Patent 2,432,287 greaselike to solid telomers are obtained by reacting ethylene with an oxo carbonyl compound at between 50° C. and 300° C. at pressures of between 20 and 1500 atmospheres in the presence of water and using a peroxygen compound as catalyst. The "telomers" are produced by a "telomerization" reaction which is defined as the process of reacting under polymerization conditions, a molecule YZ which is called a "telogen" with more than one unit of a polymerizable compound having ethylenic unsaturation called a "taxogen" to form products called "telomers" having the formula $Y(A)_nZ$ wherein $(A)_n$ is a divalent radical formed by chemical union, with formation of new carbon bonds, of $n$ molecules of the taxogen, the unit A being called a "taxomon," $n$ being any integer greater than one, and Y and Z being fragments of the telogen attached to the terminal taxomons. According to U.S. Letters Patent 2,504,400 telomers in the form of hard, high-melting waxes are obtained by polymerizing ethylene at between 140° to 200° C. and at about 425 to 475 atmospheres pressure in the presence of isopropanol and using hydrogen peroxide as catalyst. In U.S. Letters Patent 2,683,141 waxy telomers are obtained by reacting ethylene and a saturated C—H—O co-reactant, such as an alcohol or a ketone, at a temperature of from 100° to 300° C. and a pressure of from 100 to 1000 atmospheres in the presence of a catalyst.

These polyethylene telomers can be represented as

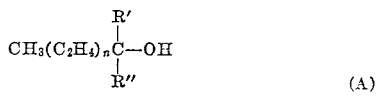
(A)

for the product obtained with a monohydric secondary alcohol, and

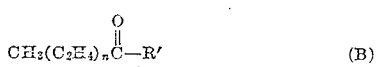
(B)

for the product obtained with a ketone. In these formulas R' and R" are alkyl groups having from 1 to about 4 carbon atoms, and $n$ is an integer having a value of at least about 30; for the purposes of this invention those having $n$ values of from about 30 to about 250 are preferred. The telomers are obtained as greases, or soft waxes, when the average molecular weight is below about 800 and as hard solids when the average molecular weight is greater than about 1000. These telomers are water insoluble and do not contain sufficient hydrophilic character to form stable aqueous emulsions.

It is an object of this invention to so modify these polyethylene telomers that they become water emulsifiable. Another object is to produce stable aqueous emulsoons of said modified polyethylenes.

A further object is to produce hard, water emulsifiable polyethylenes which can be used in such applications as floor polishes, paper coatings and textile coatings. For the purposes of this invention, a hard polyethylene has a needle penetration of 2.0 mm. or less when tested with a standard ASTM needle at 25° C. using a 200 g. load for 5 seconds (ASTM D–5–47T).

We have found that modification of polyethylene telomers by the introduction of specific hydrophilic groups into the molecule produces water emulsifiable waxes, or resins, suitable as coatings and impregnants. This has been accomplished by reacting a polyethylene telomer with a compound containing the epoxy-ethyl group

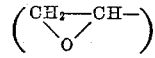

in the presence of a catalyst, such as an alkali metal, to yield a polyethylene block copolymer having the following structure:

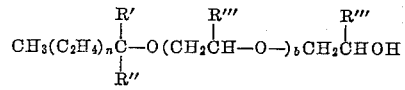

when a polyethylene telomer of formula A is used, and

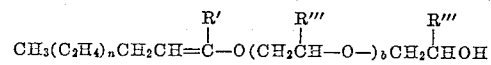

when a polyethylene telomer of Formula B is used. In these formulas R' and R" have the same meanings as hereinbefore indicated, R''' can be hydrogen, methyl or phenyl, $n$ is an integer having a value of from about 30 to about 250 and $b$ is an integer having a value of from about one to about 70. Generally speaking, the lower values of $b$ correspond to the lower values of $n$. For example, when $n=30$, the value of $b$ will vary from about 1 to about 3; when $n=100$, $b$ will vary from about 3 to about 50 and when $n=250$, $b$ will vary from about 5 to about 70. In other words, the ratio of $b$ to $n$ is normally not less than 0.02 and not greater than 0.5. The reason for this is that the lower molecular weight (about 1000 when $n=30$) polyethylene telomers are rendered water emulsifiable by the introduction of fewer hydrophilic groups than are the higher molecular weight (about 7000 when $n=250$) polyethylene telomers. However, the introduction of too great a number of hydrophilic groups renders the low molecular weight telomers water soluble rather than water dispersible and produces soft block copolymers, unsuitable for floor waxes, paper coatings and the like. In other words, the molar ratio of alkylene oxide to polyethylene telomer can be varied from about two to seventy depending on the molecular weight of telomer used and on the type of block copolymer desired.

The telomer used should not be too low in molecular weight, i.e. $n$ should not be less than 30 otherwise the resulting block copolymer is too soft for use in polishes, paper and textile coatings while, if the molecular weight is too high, i.e. $n$ is greater than 250, the block copolymer is high in melt viscosity and requires considerably higher than normal temperatures (100° C.) and pressures (760 mm.) in order to be emulsified in boiling water.

The epoxy-ethyl group containing compounds suitable for the purposes of this invention have the general formula

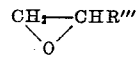

wherein R''' can be hydrogen, methyl or phenyl. Thus the suitable epoxides are ethylene oxide, propylene oxide and styrene oxide. Mixtures of these can also be used if desired. For our purposes we will designate the epoxy compounds as "alkylene oxides" and the polymeric products formed from them as "polyalkylene oxides," and it is to be understood that these terms apply to styrene oxide as well as to ethylene oxide and propylene oxide and polymers formed thereof. The properties of the block copolymer obtained depend primarily on the polyethylene telomer starting material, the alkylene oxide used in the reaction, and the amount of polyalkylene oxide built into the block copolymer molecule.

Among the polyethylene telomers suitable in this reaction are those telomers having an average molecular weight of from about 1,000 to about 7,000 as calculated from viscosity measurements in tetralin at 75° C. by the Staudinger equation:

$$\text{Molecular weight} = \frac{Nsp}{KmC}$$

wherein $Nsp =$ (viscosity of solution − viscosity of solvent)/viscosity of solvent, $Km = 0.85 \times 10^{-4}$, and $C =$ concentration of the solution expressed as the number of mols of the chain unit, $CH_2$, per liter; a melt viscosity of from about 50 to about 10,000 cps. at 250° F. as determined with a Brookfield viscosimeter, and a density of from about 0.91 to about 0.94 as determined by kerosene buoyancy. The hydroxyl and carbonyl group content of the polyethylene telomer is determined by infrared analyses and can vary from about 0.2% to about 3% by weight.

In preparing the new polyethylene-telomer-polyalkylene oxide block copolymers of this invention the polyethylene telomer is melted by heating to a temperature above the melting point of the telomer but below about 200° C., preferably from about 140° to about 180° C., and, while stirring, purging with a dry inert gas such as nitrogen, helium or argon to remove substantially all of the water from the system. Then a catalyst, such as metallic sodium, is added and the molten mass is stirred for from 2 to about 20 hours to be sure that reaction to the alkoxide is essentially complete. At this time the alkylene oxide is added by bubbling the gas through the molten mixture or by adding the liquid in a dropwise manner.

Suitable catalysts are the alkali metals, sodium, potassium, cesium and lithium, or sodium methylate, or the hydroxides of sodium and potassium. The preferred catalysts are metallic sodium or potassium since these result in a higher "blocking efficiency." By this term is meant the percentage of polymerized alkylene oxide which is bound chemically to the polyethylene to form the block copolymer. This is calculated as follows:

The total amount, G, of reacted alkylene oxide per 100 parts by weight of polyethylene telomer charged is calculated from the weight pick-up or by infrared analysis for polyalkylene oxide content after the reaction is complete. The value of G corresponds to the sum of the amount of polyalkylene oxide homopolymer formed plus the amount of polyalkylene oxide chemically combined with the polyethylene telomer to form the block copolymer. To determine the "blocking efficiency" a weighed sample of the gross reaction product is purified to remove the polyalkylene oxide homopolymer, which is more soluble than the block copolymer. Thus, the value of E, the amount of polyalkylene oxide chemically combined with 100 parts by weight of polyethylene telomer can be determined by substracting from G the weight loss during purification. From these two values the "blocking efficiency" is calculated according to the equation $$\text{Blocking efficiency} = \frac{E \times 100}{G}$$

As an added check, the filtrate from the extraction is concentrated to dryness and the residual polyalkylene oxide homopolymer determined. The polyalkylene oxide contents of the fractions can also be determined by infrared analysis.

Metallic sodium was found to be the most effective catalyst in that the gross reaction product had the highest "blocking efficiency" or the highest proportion of polyalkylene oxide chemically combined with the polyethylene telomer. The results obtained with various catalysts are listed in Table I. In each example the charge consisted of 200 g. of polyethylene telomer having an average molecular weight of about 2,000, a density at 25° C. of about 0.92, a melt viscosity of about 360 cps. at 250° F. and a hydroxyl group content of about 0.65% by weight, and from about 27 to about 36 g. of ethylene oxide was added to the polyethylene telomer at about 150° C. over a period of about 2 hours.

TABLE I

| Example | A | B | C | D | E |
|---|---|---|---|---|---|
| Catalyst used | Li | Na | K | NaOCH₃ | NaOH* |
| g. Catalyst** | 0.55 | 1.8 | 3.1 | 4.2 | 3.1 |
| Total ethylene oxide conversion, percent | 5 | 100 | 74 | 85 | (105) |
| Polyethylene oxide chemically bound to form block copolymer ("blocking efficiency") percent | 1 | 79 | 64 | 31 | 37 |

*Prepared in situ from sodium plus water.
**About 1 mole of catalyst per mole of hydroxyl in the telomer.

As is apparent in Table I sodium and potassium are the most effective catalysts since, in these cases, both high conversion of charged ethylene oxide and high blocking efficiency are obtained. It is also evident that anhydrous reaction conditions favor higher yields of block copolymer since the presence of moisture will lead to formation of the alkali hydroxide which in turn results in lower "blocking efficiencies."

The catalyst is added to the polyethylene telomer at temperatures above the melting point of the telomer but below about 200° C., preferably from about 140° to about 180° C. The amount of catalyst charged can be varied from about 0.2 to about 2.5 moles per mole of hydroxyl group present in the polyethylene telomer or even higher, but it is preferred to use about stoichiometric amounts. That is one mole of catalyst per hydroxyl or carbonyl group present in the polyethylene telomer. Table II shows the effect of catalyst concentration on the "blocking efficiency" when the reaction was carried out at 150° to 155° C. and as described for the experiments of Table I. Sodium was the catalyst used.

TABLE II

| Moles of catalyst per mole of OH or C=O group | 0.2 | 1.0 | 1.5 | 2.5 |
|---|---|---|---|---|
| Blocking efficiency, percent | 59 | 78 | 76 | 48 |

The initial reaction of the catalyst with the polyethylene telomer may be represented as follows

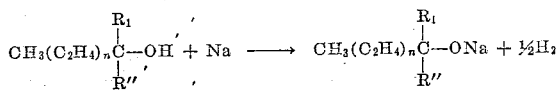

wherein R', R'' and $n$ have the same meanings as hereinbefore indicated. During this reaction the viscosity of the mixture is increased about twenty fold and occasionally there is some darkening in color to a light gray. This sodium alkoxide intermediate product initiates the growth of polyalkylene oxide block segments and these segments then displace the sodium ion and become attached to the oxygen atom.

The alkylene oxide is added to the molten polyethylene alkoxide at a temperature of from about 110° to about 200° C., preferably at from about 140° to about 180° C. The reaction is rapid and exothermic and as the alkylene oxide reacts the viscosity of the reaction mixture gradually decreases until it is about that of the original polyethylene telomer charged. In order to keep the viscosity of the reaction mixture low enough so that it will not stop the stirrer an inert hydrocarbon solvent, such as xylene or toluene, can be added to those polyethylene telomers having melt viscosities of about 3,000 cps. or more at 250° F. The hydrocarbon solvent selected must have a high enough boiling point so that it is not lost by distillation during the reaction. The amount of solvent may vary from about equal parts by weight of hydrocarbon and telomer to about 0.05 part of hydrocarbon per part of telomer, preferably about 0.1 to about 0.2 part of hydrocarbon solvent per part of telomer is used.

The polyethylene telomer-polyalkylene oxide block copolymer can be isolated from the reaction mixture as is by cooling the reaction mixture, or the molten reaction mixture can be neutralized, as by the addition of an amount of glacial acetic acid equivalent to the alkoxide concentration, and then cooled. Where the ratio of $b:n$ is no greater than about 0.25:1, the molten reaction mixture can be poured into boiling water containing sufficient acid, such as acetic, hydrochloric or sulfuric, to neutralize the catalyst. The hot slurry is then cooled and filtered and one obtains the polyethylene telomer-polyalkylene oxide block copolymer free of water soluble polyalkylene oxide homopolymer and catalyst residues. For most purposes, however, this step is unnecessary.

The total polyalkylene oxide polymer content is determined by infrared analysis, and as previously indicated the crude block copolymer can be freed of polyalkylene oxide homopolymer, by aqueous or organic solvent extraction, and the "blocking efficiency" of the reaction determined.

The polyethylene telomer-polyalkylene oxide block copolymers are tough, hard, wax-like products resembling the original polyethylenes in appearance. The melt viscosities range from about 100 to about 10,000 cps. at 250° F. and the melting points lie between about 90° to about 115° C. These properties naturally will depend on the polyethylene telomer used and the amount of alkylene oxide charged to the reaction. The polyethylene telomer-polyalkylene oxide block copolymers so obtained are readily emulsifiable in water at normal temperatures and pressures.

The polyethylene telomer-polyalkylene oxide block copolymers contain hydrophilic and hydrophobic portions in the molecule and are, therefore, similar to nonionic soaps. These products can be used to prepare aqueous emulsions. Where the polyalkylene oxide content of the block copolymer comprises at least about 20% by weight of the molecule, and preferably at least about 30% by weight, the block copolymer can be emulsified without the need of any added soap. Where the polyalkylene oxide content is between about 10% to about 20% by weight then an emulsifying agent is added which corresponds to from about 10 to about 30% by weight of the polyethylene telomer-polyalkylene oxide block copolymer used. At lower concentrations of polyalkylene oxide, that is below about 10% by weight, the emulsifying agent is about 35% by weight of the block copolymer.

The emulsifying agent is generally a mixture of oleic acid and morpholine in about equal parts by weight. Stearic acid, coconut oil or palmitic oil soaps may be substituted for the oleic acid. Sodium hydroxide, potassium hydroxide, ammonia, triethanolamine, or monoethanolamine may be used in place of the morpholine.

The emulsions are prepared by adding the emulsifying agents to the molten polyethylenetelomer-polyalkylene oxide block copolymer and then slowly adding this molten mixture to water while stirring vigorously. In this manner emulsions containing up to about 35% by weight of solids can be prepared which are stable on storage at room temperature. The particle size of the block copolymer in the aqueous emulsions varies from about 0.2 to about 5 microns. Both the crude polyethylenetelomer-polyalkylene oxide block copolymer containing polyalkylene oxide homopolymer and the purified block copolymer free of polyalkylene oxide homopolymer can be used in preparing the aqueous emulsions.

The appended examples further serve to illustrate our invention.

*Example 1*

A 500 ml. three-necked flask was equipped with a thermometer, stirrer, gas inlet tube and calcium chloride drying tube and then charged with 200 g. of a normally solid polyethylenetelomer. This polyethylenetelomer had an average molecular weight of about 1500, a density at 25° C. of about 0.92, a melt viscosity of about 150 cps. at 250° F., a hydroxyl group content of about 1.1% by weight, a melting point of 89° C. and a needle penetration of 1.6 mm. using a 200 g. load for 5 seconds (ASTM D-5-47T). Heated at 130° C. until the polyethylenetelomer was molten and then rapidly increased the temperature of the polyethylenetelomer to 150° C. Dry nitrogen gas was bubbled through the molten mass, with stirring, at about 150° C. for 15 minutes to remove substantially all moisture from the system. Clean sodium metal (1.5 g.) was added to the molten resin in small pieces and the mixture was stirred under nitrogen at 155–165° C. for about 3 hours. The flow of nitrogen was stopped and over a 2 hour period 34 g. of ethylene oxide gas was bubbled through the molten polyethylenetelomer. An exothermic reaction occurred and the temperature was maintained at 160–165° C. by regulating the ethylene oxide flow. The molten product was poured into a ceramic coated tray to cool. The crude polyethylenetelomer-polyethylene oxide block copolymer weighed 230 g. indicating a total polyethylene oxide content of 12.6% by weight. Infrared spectrum showed the absorption bands of polyethylene and polyethylene oxide. This product had a melting point of 89° C. and a needle penetration of 2.0 mm. at 25° C. with a 200 g. load for 5 seconds.

Forty grams of this crude block copolymer product were dissolved in about 160 ml. of benzene at about 75° C. and this hot solution was slowly poured, while stirring vigorously, into 1000 ml. of acetone at 25° C. to remove the polyethylene oxide homopolymer present in simple physical mixture with the block copolymer. This extraction was repeated once again and in this manner essentially all of the polyethylene oxide homopolymer present was removed as the acetone soluble fraction. The extracted block copolymer, when analyzed by infrared was shown to contain 60% by weight of the polyethylene oxide which was present in the crude polyethylenetelomer-polyethylene oxide block copolymer. The extracted product had a calculated average value of about 50 for $n$ and of about 2 for $b$.

Forty grams of the crude unextracted polyethylenetelomer-polyethylene oxide block copolymer was melted by heating to 120° C. Eight grams of oleic acid and 8 g. of morpholine were added and stirred to complete homogeneity. This system was maintained at about 115° C. and it was slowly added to 160 g. of water with agitation while maintaining the temperature of the mixing operation at 98° C. The fine particle size emulsion was cooled to room temperature and filtered through glass wool. The resultant emulsion had a 19% by weight solids content and was stable to storage at room temperature.

*Example 2*

Two hundred grams of the same polyethylenetelomer used in Example 1 was charged to the apparatus described in Example 1 and heated to about 154° C. Dry nitrogen was bubbled through the molten polyethylenetelomer for about 4 hours to remove substantially all moisture from the system. Clean metallic sodium (2.4 g.) was added to the molten resin and the mixture was stirred at 150°–155° C. for about 19 hours while maintaining a constant flow of dry nitrogen. The nitrogen flow was discontinued and in its place over a period of 2.25 hours at a temperature of 151°–156° C. bubbled in 31 g. of ethylene oxide gas at a constant rate. Then added a molar amount of glacial acetic acid, equivalent to the sodium charged, and cooled the product. The crude polyethylenetelomer-polyethylene oxide block copolymer weighed 226 g. and it had a melting point of 90° C. and a needle penetration of 1.9 mm. under a 200 g. load for 5 seconds. Infrared analysis of the gross product showed a total polyethylene oxide content of 11.5% by weight.

Ten grams of this crude block copolymer were extracted with water for about 60 hours in a Soxhlet extractor to remove the simple polyethylene oxide homopolymer from the polyethylenetelomer - polyethylene oxide block copolymer. The extracted block copolymer had a 9.7% by weight polyethylene oxide content as shown by infrared analysis. The calculated average value of $n$ was about 50 and about 3 for $b$. An aqueous emulsion was prepared with the gross product, as described in Example 1, which contained 21% by weight of solids and which was stable to storage at room temperature.

*Example 3*

Two hundred grams of a normally solid polyethylenetelomer having an average molecular weight of about 2000, a density at 25° C. of about 0.92, a melt viscosity of about 400 cps. at 250° F., a needle penetration of 0.7 mm. using a 200 g. load for 5 seconds, a melting point of 98° C. and a hydroxyl content of 0.7% by weight was charged to an apparatus as described in Example 1. Heated to about 150° C. and purged with dry nitrogen as in Example 1 for about 2 hours. Clean metallic sodium (1.8 g.) was added to the molten resin and stirred at 150°–158° C. for about 24 hours while maintaining a constant flow of dry nitrogen through the molten reaction mass. The nitrogen flow was discontinued and over a period of 1.5 hours at a temperature of 140°–160° C. bubbled 36 g. of ethylene oxide gas through the molten resin and then cooled to room temperature. The crude polyethylenetelomer-polyethylene oxide block copolymer weighed 236 g. It had a needle penetration of 0.9 mm. at a 200 g. load for 5 seconds and a melting point of 99° C. Infrared analysis showed a total polyethylene oxide content of 15.2% by weight in the crude gross product.

Ten grams of this crude block copolymer were extracted with water for about 78 hours in a Soxhlet extractor as in Example 2. The purified polyethylenetelomer-polyethylene oxide block copolymer had a 12.5% by weight polyethylene oxide content as shown by infrared analysis. The calculated average value of $n$ was about 70 and about 5.5 for $b$.

An aqueous emulsion was prepared with the crude gross product, as described in Example 1, which contained 25% by weight of solids and which was stable to storage at room temperature.

*Example 4*

Two hundred grams of the same polyethylenetelomer used in Example 3 was charged to the apparatus described in Example 1 and heated to about 150° C. Dry nitrogen was bubbled through the molten resin for about 1.5 hours to remove essentially all of the water in the system. Added 3.1 g. of clean metallic potassium to the molten resin and stirred at 151°–154° C. for 4.5 hours while maintaining a constant flow of dry nitrogen through the molten resin. The nitrogen flow was discontinued and over a period of 1.8 hours at a temperature of 152°–156° C. bubbled 32 g. of ethylene oxide gas through the molten resin and then cooled to room temperature. The crude polyethylenetelomer-polyethylene oxide block copolymer weighed 224 g. Infrared analysis showed a total polyethylene oxide content of 10.5% by weight in the crude gross product. The gross product had a needle penetration of 0.7 mm. using a 200 g. load for 5 seconds.

Ten grams of this crude block copolymer were extracted with water for about 68 hours as described in Example 2. The purified polyethylenetelomer-polyethylene oxide block copolymer had a 6.3% by weight polyethylene oxide content as shown by infrared analysis. The calculated average value of $n$ was about 70 and about 2.2 for $b$. An aqueous emulsion was prepared with the crude gross product, as described in Example 1, which contained 25% by weight of solids and which was stable to storage at room temperature.

*Example 5*

The equipment of Example 1 was charged with 200 g. of a normally solid polyethylenetelomer which had an average molecular weight of about 5000, a density at 25° C. of about 0.92, a melt viscosity of about 7000 cps. at 250° F., a needle penetration of 0.5 mm. using a 200 g. load for 5 seconds, a hydroxyl group content of 0.3% by weight and a melting point of 107° C. Heated to about 150° C. and purged at about this temperature for about 1.5 hours by bubbling dry nitrogen gas through the molten resin. Added 1 g. of clean metallic sodium to the molten resin and stirred at about 140°–170° C. for about 16 hours while maintaining a constant flow of dry nitrogen through the molten resin. Discontinued the nitrogen flow and over a period of 3.5 hours at 150°–154° C. bubbled 58 g. of ethylene oxide gas through the molten resin. Then neutralized with glacial acetic acid and let cool to room temperature. The crude polyethylenetelomer-polyethylene oxide block copolymer weighed 252 g. It had a needle penetration of 1.1 mm. at a 200 g. load for 5 seconds and a melting point of 101° C. Infrared analysis showed a total polyethylene oxide content of 20.7% by weight in the crude gross product.

Ten grams of this crude block copolymer were extracted with water for about 48 hours as described in Example 2. The purified polyethylenetelomer-polyethylene oxide block copolymer had an 18.2% by weight polyethylene oxide content as shown by infrared analysis. The calculated average value of $n$ was about 175 and about 26 for $b$. This purified product had a needle penetration of 0.9 mm. at a 200 g. load for 5 seconds and melted at 102° C. An aqueous emulsion was prepared with the crude gross product, as described in Example 1, which contained 13% by weight of solids. In like manner an aqueous emulsion was prepared with the purified block copolymer having a 15% by weight solids content. Both emulsions were stable to storage at room temperature.

*Example 6*

Two hundred grams of a normally solid polyethylenetelomer was charged to the equipment described in Example 1. This polyethylenetelomer had an average molecular weight of about 2000, a density at 25° C. of about 0.94, a melt viscosity of about 200 cps. at 250° F. and a ketonic carbonyl content of about 1% by weight. It melted at 112° C. and had a needle penetration of 0.5 mm. using a 200 g. load for 5 seconds. Heated the resin to about 145° C. and purged the molten resin at this temperature by bubbling dry nitrogen through the melt for about 2 hours. Clean metallic sodium (1.8 g.) was added to the molten resin and stirred at about 140°–145° C. for about 18 hours while maintaining a constant flow of dry nitrogen through the molten resin. Discontinued the nitrogen flow and over a 3.5 hour period at 150°–155° C. bubbled 45 g. of ethylene oxide gas through the molten resin. Then neutralized with glacial acetic acid and let cool to room temperature. The crude polyethylenetelomer-polyethylene oxide block copolymer weighed 236.5 g., melted at 105° C. and had a needle penetration of 0.9 mm. at a 200 g. load for 5 seconds. Infrared analysis showed a total polyethylene oxide content of 15.4% by weight in the crude gross product.

Twenty grams of the crude block copolymer was dissolved in 200 ml. of boiling toluene. This was slowly added with vigorous stirring to five times its volume of methanol at 25° C. to remove the polyethylene oxide homopolymer. The extraction was repeated once again and the purified block copolymer now contained 12.7% by weight of polyethylene oxide as determined by infrared analysis. The calculated average value of $n$ was about 105 and about 9.7 for $b$. This purified product had a needle penetration of 0.4 mm. at a 200 g. load for 5 seconds and melted at 102° C. An aqueous emulsion was prepared with the crude gross product, as described in Example 1, which contained 21% by weight of solids. In like manner an aqueous emulsion was prepared with the purified block copolymer having an 18% by weight solids content. Both emulsions were stable to storage at room temperature.

*Example 7*

Two hundred grams of a normally solid polyethylene telomer was charged to the equipment described in Example 1. This polyethylene telomer had an average molecular weight of about 1500, a density at 25° C. of about 0.92, a melt viscosity of about 150 cps. at 250° F. and a hydroxyl content of about 1.1% by weight. Heated to about 150°–170° C. and purged the molten mass at this temperature with dry argon for about 1.5 hours. Clean metallic lithium (0.73 g.) was added to the molten resin and heated to about 190° C. to melt the lithium; then stirred at 150°–170° C. for 20 hours under an argon atmosphere. Over a 2.75 hour period added 42 g. of ethylene oxide at about 150°–170° C. The crude polyethylene telomer-polyethylene oxide block copolymer weighed 201.5 g. Infrared analysis showed a polyethylene oxide content of about 0.5% by weight. The block copolymer melted at 98°–100° C. and had a needle penetration of 1.8 mm. at a 200 g. load for 5 seconds.

*Example 8*

Two hundred grams of a normally solid polyethylene telomer was charged to the equipment described in Example 1. The polyethylene telomer had an average molecular weight of about 2000, a density at 25° C. of about 0.92, a melt viscosity of about 400 cps. at 250° F. and a hydroxyl group content of about 0.7% by weight. Heated to about 150° C. and purged the molten mass with dry nitrogen for about 2 hours. Added 4.2 g. of dry sodium methylate to the molten resin and stirred at about 145° to 155° C. for 2 hours under a nitrogen atmosphere. Over a period of 1.75 hours added 34 g. of ethylene oxide at 153°–155° C. The crude polyethylene telomer-polyethylene oxide block copolymer weighed 229 g. Infrared analysis showed a polyethylene oxide content of about 12.6% by weight in the gross product, of which 31% was chemically combined to the polyethylene.

*Example 9*

Two hundred grams of a normally solid polyethylene telomer was charged to the equipment described in Example 1. The polyethylene telomer had an average molecular weight of about 2,000, a density at 25° C. of about 0.92, a melt viscosity of about 400 cps. at 250° F. and a hydroxyl group content of about 0.7% by weight. Heated to about 150° C. and purged with dry nitrogen for about 2 hours. Clean metallic sodium (3.1 g.) was added to the molten resin and stirred at about 150° C. for about 1 hour; then added 1.4 g. of water and stirred for about 1.5 hours. Over a 1.75 hour period added 27 g. of ethylene oxide at 152°–153° C. The crude polyethylene telomer-polyethylene oxide block copolymer weighed 227 g. Infrared analysis showed a polyethylene oxide content of about 12.5% by weight, of which 37% was chemically combined to the polyethylene.

*Example 10*

Two hundred grams of a normally solid polyethylene telomer was charged to the equipment described in Example 1. The polyethylene telomer had an average molecular weight of about 2,000, a density at 25° C. of about 0.92, a melt viscosity of about 400 cps. at 250° F. and a hydroxyl content of about 0.7% by weight. Heated to about 150° C. and purged with dry nitrogen for about 2 hours. Clean metallic sodium (1.8 g.) was added to the molten resin and stirred at about 140° C. for about 2 hours. Over a 1 hour period added 30 g. of propylene oxide at 136°–140° C. The crude polyethylene telomer-polypropylene oxide block copolymer weighed 207.5 g. Infrared analysis showed a polypropylene oxide content of about 4% by weight, of which about 70% was chemically combined with the polyethylene.

*Example 11*

The same polyethylene telomer and apparatus were used as described in Example 10. After reacting the polyethylene telomer with the catalyst, slowly added 100 g. of styrene oxide over a 1.7 hour period at 152°–168° C. The crude product weighed about 300 g. and infrared analysis showed a polystyrene oxide content of about 33% by weight, of which about 35% was chemically combined with the polyethylene.

*Example 12*

Two hundred grams of a normally solid polyethylene telomer was charged to the equipment described in Example 1. The polyethylene telomer had an average molecular weight of about 2,000, a density at 25° C. of about 0.92, a melt viscosity of about 400 cps. at 250° F. and a hydroxyl content of about 0.7% by weight. Purged with dry nitrogen at 140°–145° C. for about 2 hours. Clean metallic sodium (1.5 g.) was added to the molten resin and stirred at 150°–155° C. for about 4 hours. Then over an 18 hour period bubbled 169 g. of dry ethylene oxide through the molten reaction mass at about 140°–150° C. The crude product weighed 340 g. Infrared analysis showed a polyethylene oxide content of about 41% by weight in the crude gross product.

A portion of the gross product was extracted with heptane and water as described in Example 13. The purified block copolymer had a 29.5% by weight polyethylene oxide content, an $n$ value of 70 and a $b$ value of 18.

Forty grams of the crude polyethylene telomer-polyethylene oxide block copolymer of this example was melted by heating to about 120° C. This was then slowly added to about 200 g. of water with vigorous agitation while maintaining the temperature of the mixing operation at 98° C. The emulsion was filtered through glass wool and had a solids content of 13% by weight. A second 40 g. portion of the crude polyethylene telomer-polyethylene oxide block copolymer of this example was melted at 120° C. and 8 g. of oleic acid was added; the mixture was stirred to complete homogeneity. This system was maintained at about 115° C. and was then slowly added with agitation to 160 g. of water while maintaining the temperature of the mixing operation at 98° C. The emulsion was filtered through glass wool and had a solids content of 17% by weight. Both emulsion compositions were stable to storage at room temperature.

*Example 13*

Two hundred grams of a solid polyethylene telomer having an average molecular weight of about 5000, a melting point of 109° C., a density at 25° C. of about 0.92, a melt viscosity of about 7,000 cps. at 250° F., a needle penetration of 0.5 mm. at a 200 g. load for 5 seconds and a hydroxyl content of 0.35% by weight was charged to an apparatus as described in Example 1. Heated the resin to 115° C. and purged with dry nitrogen as in Example 1 for about 0.5 hours; then added 50 ml. of xylene and heated to 125° C. and purged another hour. Clean sodium metal (0.92 g.) was added and stirred the reaction at 125° to 135° C. for about 1.5 hours while maintaining a constant flow of dry nitrogen through the reaction mixture. Xylene loss was minimized by use of a reflux condenser. Discontinued the nitrogen flow, and over a 20 hour period bubbled 135 g. of ethylene oxide gas through the resin solution. The xylene was then distilled off at reduced pressure and the residue was cooled to room temperature. The crude polyethylene telomer-polyethylene oxide block copolymer weighed 325 g., melted at 111° C. and had a needle penetration of 0.55 mm. at a 200 g. load for 5 seconds. Infrared analysis showed a polyethylene oxide content of 38.5% by weight in the crude gross product.

Two grams of this crude block copolymer were dissolved in 20 ml. of boiling heptane and this solution was successively extracted 3 times with 20 ml. portions of hot water at 95° to 98° C. The purified polyethylene telomer-polyethylene oxide block copolymer had a polyethylene oxide content of about 33% by weight as shown by infrared analysis. The calculated average value of $n$ was about 175 and about 55 for $b$.

Forty grams of the crude unextracted polyethylene telomer-polyethylene oxide block copolymer was melted at 115° C. and 8 g. of oleic acid and 4 g. of morpholine were added and the mixture was stirred to complete homogeneity. This system was maintained at 105° C. and was then added to 160 g. of boiling water with agitation. The fine particle size emulsion was cooled to room temperature and filtered through glass wool. The filtered product had a solids content of 20% by weight and was stable to storage at room temperature.

The blocking efficiencies of the polyethylene telomer-polyalkylene oxide block copolymers described in the foregoing examples are tabulated in Table III.

TABLE III

| Ex. No. | 1 | 2 | 3 | 4 | 5 | 6 | 7 | 8 | 9 | 10 | 11 | 12 | 13 |
|---|---|---|---|---|---|---|---|---|---|---|---|---|---|
| Blocking Effic., Percent | 60 | 86 | 79 | 64 | 85 | 80 | ---- | 31 | 37 | 69 | 35 | 72 | 86 |

What is claimed is:

1. A method of preparing polyethylene telomer-polyalkylene oxide block copolymers, which comprises reacting an oxygen containing polyethylene telomer having from about 30 to about 250 consecutively repeating $$-C_2H_4-$$

groups, selected from the group consisting of monohydric aliphatic alcohol modified polyethylenes and dialkyl ketone modified polyethylenes, with an alpha alkylene oxide, selected from the group consisting of ethylene oxide, 1,2-propylene oxide, styrene oxide and mixtures thereof, in the presence of from about 0.2 to about 2.5 moles per mole of hydroxyl and carbonyl group present in the telomer of a condensation catalyst selected from the group consisting of the sodium, lithium, cesium, potassium, sodium methylate and the hydroxides of sodium and potassium, at a temperature above the melting point of the polyethylene telomer but below about 200° C.

2. A method of preparing polyethylene telomer-polyalkylene oxide block copolymers having the general formula

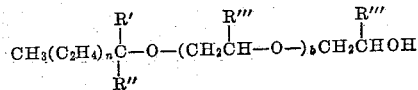

wherein R' and R" are alkyl groups having from 1 to about 4 carbon atoms, R''' is a member selected from the group consisting of hydrogen, methyl and phenyl, $n$ is an integer having a value of from about 30 to about 250 and $b$ is an integer having a value of from about 1 to about 70 and wherein the ratio of $b:n$ can vary from about 0.02:1 to about 0.5:1, which comprises reacting a melt of an alcohol-modified polyethylene having the general formula

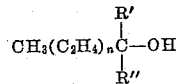

wherein R', R" and $n$ have the same meanings as hereinbefore indicated with from about 0.2 to about 2.5 moles per mole of hydroxyl group present in the alcohol-modified polyethylene of a catalyst selected from the group consisting of the sodium, cesium, lithium, potassium, sodium methylate, and the hydroxides of sodium and potassium, and then adding thereto an alkylene oxide having the general formula

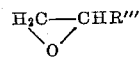

wherein R''' has the same meaning as hereinbefore indicated and allowing the reaction to proceed in the molten state at a temperature of from about 110° to about 200° C.

3. The method of claim 2 wherein the molar ratio of catalyst to hydroxyl group present in the alcohol-modified polyethylene telomer is about 1:1.

4. The method of claim 2 wherein a molar amount of sodium metal to hydroxyl groups is employed as the catalyst.

5. The method of preparing polyethylene telomer-polyalkylene oxide block copolymers having the general formula

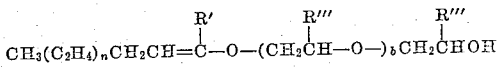

wherein R' represents an alkyl group having from 1 to about 4 carbon atoms, R''' is a member selected from the group consisting of hydrogen, methyl and phenyl, $n$ is an integer having a value of from about 30 to about 250 and $b$ is an integer having a value of from about 1 to about 70, and wherein the ratio of $b:n$ can vary from about 0.02:1 to about 0.5:1, which comprises reacting a melt of a ketone-modified polyethylene having the general formula

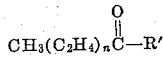

wherein R' and $n$ have the same meanings as hereinbefore indicated with from about 0.2 to about 2.5 moles per mole of carbonyl group present in the ketone-modified polyethylene of a catalyst selected from the group consisting of the sodium, cesium, lithium, potassium, sodium methylate, and the hydroxides of sodium and potassium and then adding thereto an alkylene oxide having the general formula

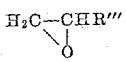

wherein R''' has the same meaning as hereinbefore indicated and allowing the reaction to proceed to completion while still in a molten state at a temperature of from about 110° to about 200° C.

6. The method of claim 5 wherein the molar ratio of catalyst to ketonic oxygen present in the ketone-modified polyethylene telomer is about 1:1.

7. The method of claim 5 wherein a molar amount of sodium metal to carbonyl groups is employed as the catalyst.

8. Water emulsifiable polyethylene telomer-polyalkylene oxide block copolymers having the general formula

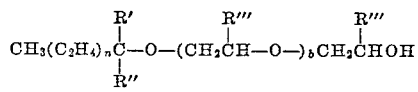

wherein R', R'', R''', n and b have the same meanings as indicated in claim 2, and wherein the ratio of b:n can vary from about 0.02:1 to about 0.5:1.

9. Water emulsifiable polyethylene telomer-polyalkylene oxide block copolymers having the general formula

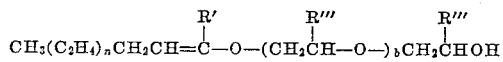

wherein R', R''', n and b have the same meanings as indicated in claim 5, and wherein the ratio of b:n can vary from about 0.02:1 to about 0.5:1.

10. A composition of matter comprising an aqueous emulsion containing up to about 35% by weight of a water emulsifiable polyethylene telomer-polyalkylene oxide block copolymer having the general formula

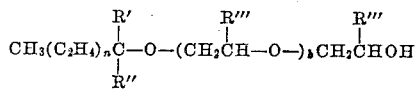

wherein R' and R'' are alkyl groups having from 1 to about 4 carbon atoms, R''' is a member selected from the group consisting of hydrogen, methyl and phenyl, n is an integer having a value of from about 30 to about 250 and b is an integer having a value of from about 1 to about 70 and wherein the ratio of b:n can vary from about 0.02:1 to about 0.5:1.

11. A composition of matter as claimed in claim 10, said composition containing therein up to about 35% by weight of an emulsifying agent based on the weight of the block copolymer.

12. A composition of matter as claimed in claim 10, said composition containing therein up to about 12% by weight of an emulsifying agent based on the weight of the block copolymer.

13. A composition of matter comprising an aqueous emulsion containing up to about 35% by weight of a water emulsifiable polyethylene telomer-polyalkylene oxide block copolymer having the general formula

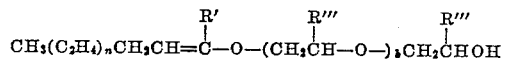

wherein R' represents an alkyl group having from 1 to about 4 carbon atoms, R''' is a member selected from the group consisting of hydrogen, methyl and phenyl, n is an integer having a value of from about 30 to about 250 and b is an integer having a value of from about 1 to about 70 and wherein the ratio of b:n can vary from about 0.02:1 to about 0.5:1.

14. A composition of matter as claimed in claim 13, said composition containing therein up to about 35% by weight of an emulsifying agent based on the weight of the block copolymer.

15. A composition of matter as claimed in claim 13, said composition containing therein up to about 12% by weight of an emulsifying agent based on the weight of the block copolymer.

16. A method of producing polyethylene telomer-polyalkylene oxide block copolymers which comprises reacting a polyethylene telomer, selected from the group consisting of polyethylene telomers having the general formula:

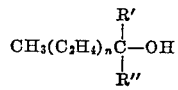

and polyethylene telomers having the general formula:

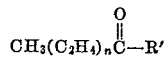

wherein R' and R'' are alkyl groups having from 1 to about 4 carbon atoms, and n is an integer having a value of from about 30 to about 250, with a 1,2-alkylene oxide selected from the group consisting of ethylene oxide, 1,2-propylene oxide, styrene oxide, and mixtures thereof, in the presence of from about 0.2 to about 2.5 moles, per mole of telogen in said polyethylene telomer, of a catalyst selected from the group consisting of sodium, lithium, cesium, potassium, sodium methylate, and the hydroxides of sodium and potassium, at a temperature of from about 110° C. to about 200° C.

References Cited in the file of this patent
UNITED STATES PATENTS

| | | |
|---|---|---|
| 1,970,578 | Schoeller et al. | Aug. 21, 1934 |
| 2,402,137 | Hanford et al. | June 18, 1946 |
| 2,516,960 | Coffman | Aug. 1, 1950 |
| 2,623,875 | Schlosser et al. | Dec. 30, 1952 |
| 2,674,619 | Lundsted | Apr. 6, 1954 |
| 2,677,700 | Jackson et al. | May 4, 1954 |

OTHER REFERENCES

D'Alelio: "Fundamental Principles of Polymerization," 1952, Wiley & Sons, Inc., New York City, page 46.

UNITED STATES PATENT OFFICE

CERTIFICATE OF CORRECTION

Patent No. 2,921,920                      January 19, 1960

Joseph J. Smith et al.

It is hereby certified that error appears in the printed specification of the above numbered patent requiring correction and that the said Letters Patent should read as corrected below.

Column 2, lines 6 and 7, for "emulsoons" read -- emulsions --; column 4, line 60, in the formula, for the variable "$R_1$", each occurrence, read -- $R'$ --.

Signed and sealed this 6th day of September 1960.

(SEAL)
Attest:

ERNEST W. SWIDER                            ROBERT C. WATSON
Attesting Officer                                Commissioner of Patents